United States Patent
Ishibashi et al.

(10) Patent No.: US 10,738,898 B2
(45) Date of Patent: Aug. 11, 2020

(54) SWITCHING VALVE

(71) Applicant: FUJIKIN INCORPORATED, Osaka-shi (JP)

(72) Inventors: Keisuke Ishibashi, Osaka (JP); Tadayuki Yakushijin, Osaka (JP); Ryohei Fujimoto, Osaka (JP); Norifumi Suntou, Osaka (JP); Michio Yamaji, Osaka (JP); Yasuhiro Yoshikane, Tokyo (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 11 days.

(21) Appl. No.: 16/087,265

(22) PCT Filed: Jan. 30, 2018

(86) PCT No.: PCT/JP2018/002865
§ 371 (c)(1),
(2) Date: Sep. 21, 2018

(87) PCT Pub. No.: WO2018/143158
PCT Pub. Date: Aug. 9, 2018

(65) Prior Publication Data
US 2019/0093774 A1    Mar. 28, 2019

(30) Foreign Application Priority Data
Jan. 31, 2017  (JP) .................. 2017-015383

(51) Int. Cl.
*F16K 11/044* (2006.01)
*F16K 1/34* (2006.01)
(Continued)

(52) U.S. Cl.
CPC .............. *F16K 11/044* (2013.01); *F15B 1/00* (2013.01); *F16K 1/34* (2013.01); *F16K 11/20* (2013.01);
(Continued)

(58) Field of Classification Search
USPC .................................................... 137/625.48
See application file for complete search history.

(56) References Cited

U.S. PATENT DOCUMENTS 3,107,692 A * 10/1963 Haakon ............... F16K 31/1221
137/625.27
3,563,268 A *  2/1971 Williams ............. F16K 11/044
137/386

(Continued)

FOREIGN PATENT DOCUMENTS

JP    2012-107709 A    6/2012
TW       428059 B      4/2001

OTHER PUBLICATIONS

International Search Report dated Apr. 10, 2018, issued for PCT/JP2018/002865.

(Continued)

Primary Examiner — John Fox
(74) Attorney, Agent, or Firm — Locke Lord LLP

(57) ABSTRACT

Provided is a switching valve for use in an analyzer module for switching flow passages of fluids, in which the manufacturing cost is reduced and the life is increased. The valve element is provided with a lower contact portion that comes into close contact with a lower valve seat disposed at a valve body when a valve is closed, and with an upper contact portion that comes into close contact with an upper valve seat disposed at a counter plate when the valve is open. The counter plate has a first recess that is open downward and a second recess that is open toward the first recess and has a smaller horizontal cross-sectional area than that of the first recess, and the upper valve seat is press-fitted into the second recess.

1 Claim, 7 Drawing Sheets

(51) Int. Cl.
*F15B 1/00* (2006.01)
*F16K 27/00* (2006.01)
*F16K 31/122* (2006.01)
*F16K 11/20* (2006.01)

(52) U.S. Cl.
CPC ........ *F16K 27/003* (2013.01); *F16K 31/1221* (2013.01); *Y10T 137/86686* (2015.04); *Y10T 137/86895* (2015.04)

(56) References Cited

U.S. PATENT DOCUMENTS

| | | | | |
|---|---|---|---|---|
| 3,727,631 | A | * | 4/1973 | Suezawa ............... F16K 11/044 137/243.2 |
| 4,051,862 | A | * | 10/1977 | Haytayan ................ B25C 1/043 137/454.2 |
| 4,565,217 | A | * | 1/1986 | McIntyre .............. B05C 5/0225 137/563 |
| 6,619,321 | B2 | | 9/2003 | Reid, II et al. |
| 2005/0072479 | A1 | * | 4/2005 | Wuollet ................ F16K 11/044 137/625.48 |
| 2013/0263955 | A1 | | 10/2013 | Hirota |

OTHER PUBLICATIONS

Office Action dated dated Apr. 27, 2020, issued for the corresponding Taiwanese patent application No. 107103376 and machine English translation thereof.

\* cited by examiner

Prior Art

SWITCHING VALVE

TECHNICAL FIELD

The present invention relates to a switching valve used for a fluid control device mounted in, for example, an analyzer system for analyzing constituents of a fluid such as gas.

BACKGROUND ART

Patent Literature 1 shows in FIG. 4 (FIG. 6 in the present description) and in FIG. 8 (FIG. 7 in the present description) a known steam selector. The steam selector is roughly composed of a module body (33), a valve spindle (86), a valve body (58), and a piston (59).

In such a switching valve, the valve spindle (86) is moved up and down by the piston (59). When the valve spindle (86) is pushed down, a seal plug (99) disposed in the valve element formed at the lower portion of the valve spindle comes into close contact with a front-side valve seat (104) of a left-side valve to enter a closed state in which a fluid cannot get into a fluid control chamber (50). When the valve spindle (86) is pushed up, a back-side seal plug (98) comes into close contact with a back-side valve seat to enter an open state in which a fluid inside the fluid control chamber (50) is sent to the control chamber (50) on the right, passes through a flow passage (26), and is discharged outside the switching valve.

Arranging multiple steam selectors with such a structure and sending a large number of types of gases being switched swiftly to an analysis device allow an efficient analysis.

CITATION LIST

Patent Literature

Patent Literature 1: U.S. Pat. No. 6,619,321

SUMMARY OF INVENTION

Technical Problem

As shown in FIG. 7, Patent Literature 1 discloses a switching valve in which the front-side seal plug (99) and the back-side seal plug (98) are attached to the valve element of the valve spindle (86) by caulking.

The valve spindle with this structure requires caulking at two locations while being centered at the time of manufacturing the valve spindle. At this time, caulking must be done after a long valve spindle is machined into a required shape. In addition, each caulking must be done while centering is performed. Therefore, the machining is difficult, and in addition, performing this operation on the valve element located at the distal end portion of a long valve stem of the valve spindle causes the centering operation to become more difficult.

When the centering of the two seal plugs is not performed sufficiently, uneven wear, which is the cause of a leak of the fluid, is caused at either of the seal plugs when the seal plug is brought into close contact with the valve seat. As a result, the life of the seal plug shortens and the valve spindle must be replaced frequently.

In addition, because there is no structure having a function of guiding the valve element when the valve spindle is moved up and down by the piston, moving the valve spindle up and down generates runouts of the valve stem of the valve spindle, which encourages uneven wear of the seal plug disposed at the distal end of the valve spindle.

An object of the present invention is to change the structure of the valve seat and a valve contact portion corresponding to the seal plug, to facilitate the manufacture of the switching valve, to reduce cost, and to increase the life of the switching valve.

Solution to Problem

The present invention (1) relates to a switching valve including: a valve body having a control space for controlling a fluid; a valve element that moves within the control space to control the fluid; and a counter plate that prevents the fluid from flowing upward out of the control space, the switching valve characterized in that the valve element is provided with a lower contact portion that comes into contact with a lower valve seat disposed at the valve body when the valve is closed and with an upper contact portion that comes into contact with an upper valve seat disposed at the counter plate when the valve is open, the counter plate has a first recess that is open downward and a second recess that is open toward the first recess and has a smaller horizontal cross-sectional area than that of the first recess, and the upper valve seat is press-fitted into the second recess.

In the conventional switching valve disclosed in Patent Literature 1, the lower contact portion and the upper contact portion are attached to the valve element by caulking, and therefore, there exists a problem that the valve contact portions must be centered with respect to each other.

To reduce time and effort required for centering the lower and upper contact portions, the present invention (1) has such a configuration that the upper valve seat is press-fitted into the counter plate, and the position of the caulking member is changed from the valve element side to the counter plate side whereby the axis of the valve stem and the axis of the upper valve seat are aligned with each other.

Because the upper valve seat is configured such that a member of the upper valve seat is press-fitted into the recess formed at the counter plate side, which configuration allows relatively easy machining, fabrication with a high level of accuracy of machining is possible and reducing runout is possible.

With this configuration, adjustment of runout of the valve element can be accomplished by merely adjusting the lower contact portion, which leads to cost reduction associated with the manufacturing of the valve spindle. Further, because uneven wear of the valve contact portion does not occur, the life of the switching valve is increased.

The present invention (2) relates to a switching valve described in the present invention (1), wherein an intermediate portion between the lower contact portion and the upper contact portion is provided with a guide portion, and a side surface of the first recess is circumscribed on the guide portion.

The guide portion provided at the intermediate portion between lower contact portion and the upper contact portion in accordance with the present invention (2) is in contact with an inner wall of the first recess of the counter plate.

The guide portion of the valve element is guided along the inner wall of the first recess of the counter plate fixed to the valve body, whereby the valve element moves. Because of this configuration, runout of the axis of the valve spindle is reduced and uneven wear of the upper contact portion is prevented, which leads to a further increase of the life of the switching valve.

The present invention (3) relates to a switching valve described in the present invention (2), wherein a gap is provided between the side surface of the first recess and a side surface of the guide portion.

The shape of the horizontal cross section of the first recess is a circle, and the shape of the horizontal cross section of the guide portion is a polygon. The circle of the horizontal cross section of the first recess is circumscribed on the polygon of the horizontal cross section of the guide portion. Into the vent space located above the control space, the fluid flows through the gap between the circle and the side of the polygon while the valve element moves. In the case of an open state in which the upper valve seat and the upper contact portion do not contact with each other, the control space is in communication with the vent space.

Advantageous Effects of Invention

With this switching valve, manufacturing thereof is possible while runout of the valve seat and the valve element being reduced, and therefore, manufacturing thereof is facilitated and the cost is reduced. In addition, because uneven wear of the valve contact portion can be prevented, the life of the switching valve can be increased.

DESCRIPTION OF EMBODIMENTS

The embodiments of the present invention will be hereinafter described in detail by example with reference to the accompanying drawings. The dimensions, materials, shapes, and relative arrangements, and the like, of the components described in the embodiments, and manufacturing conditions thereof are not given for the purpose of restricting the scope of the present invention, but are merely examples for illustration, unless specified otherwise.

Figure 1:
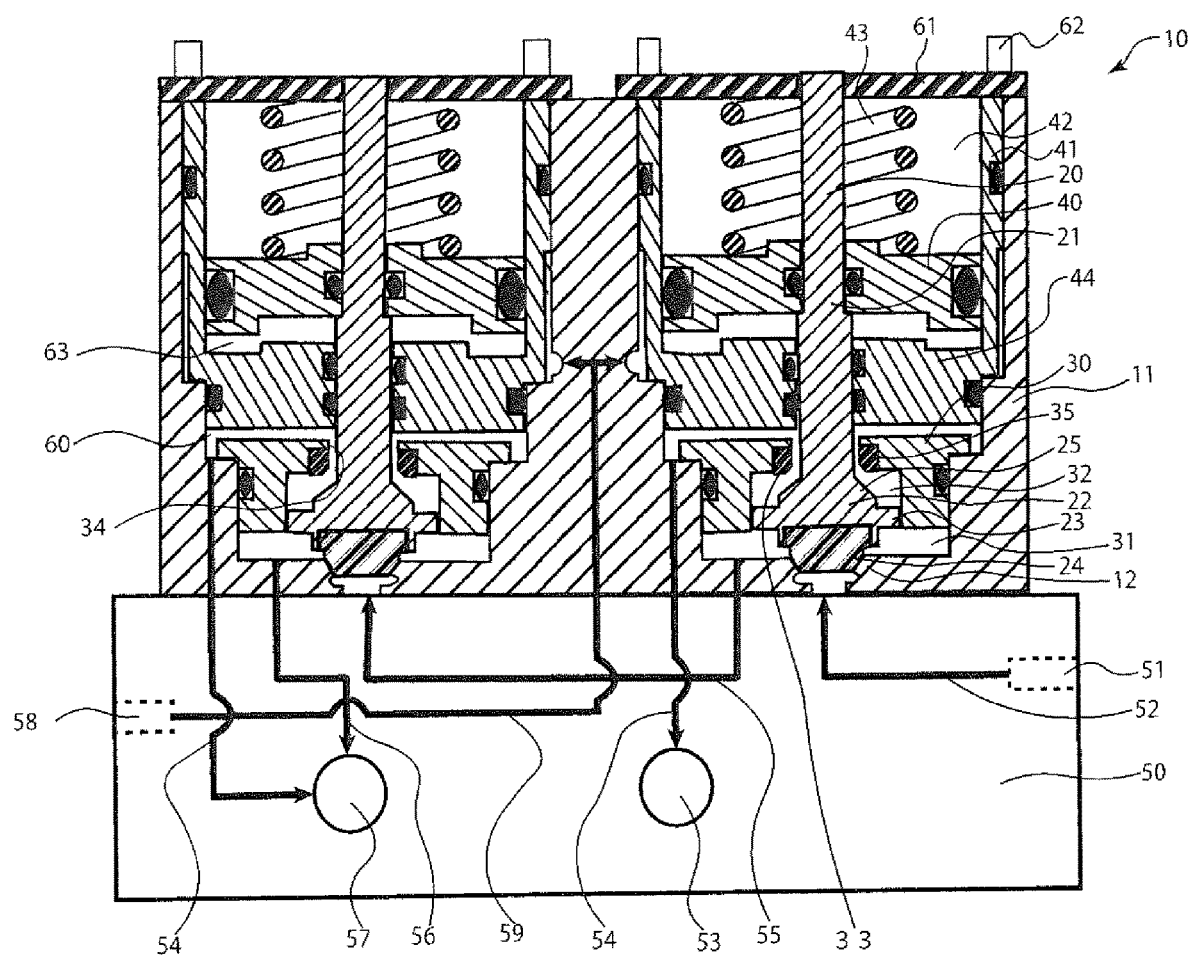
FIG. 1 is a longitudinal sectional view showing an embodiment of a switching valve module in which a switching valve in accordance with the present invention is mounted, which shows a state when the valve is closed.

As shown in FIG. 1, the switching valve module (10), to which a switching valve in accordance with the present invention is mounted, consists of a valve body (11) and a base (50).

The valve body (11) includes a valve spindle (20), a counter plate (30), an actuator body (44), a piston (40), a cylindrical body portion (41), a spring (43), a lid (61), and a bolt (62). In addition, the valve body includes O-rings.

Each of the area between the components which is needed for sealing is sealed with the O-ring. In the drawings, the O-ring is shown as a black ellipse with no reference numbers.

The base (50) includes an analyzer gas inlet (51), a driver gas inlet (58), a vent line (53), and an analyzer gas outlet (57), each of which has an opening. In addition, the base (50) includes therein an analyzer gas inflow passage (52), a vent line communicating passage (54), a driver gas inflow passage (59), an analyzer gas migration passage (55), and an analyzer gas outflow passage (56). Arrows shown in the drawings indicate the direction in which gases flow. The left side of FIG. 1 is referred to as "left", and the right side of FIG. 1 is referred to as "right".

Figure 3:
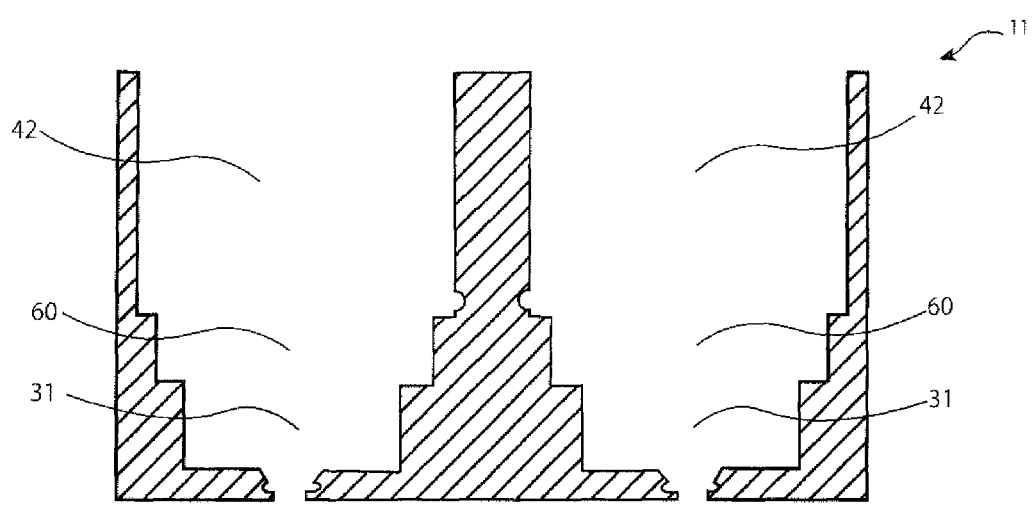
FIG. 3 is a longitudinal sectional view showing an embodiment of the valve body of the switching valve in accordance with the present invention.

As shown in FIG. 3, each of left and right portions of the valve body (11) is provided with, beginning at the bottom, a control space (31), a vent space (60), and a drive space (42). In the control space (31), the counter plate (30) is accommodated and is fixed to the valve body (11).

In the vent space (60), the actuator body (44) is accommodated and is fixed to the valve body (11). In the drive space (42), the cylindrical body portion (41) of the actuator body (44) is accommodated and is fixed to the valve body (11). Inside the cylindrical body portion (41), the piston (40) is movably accommodated.

The valve body (11) has an upper end surface that is covered with a lid (61) so as to close the drive space (42). The lid (61) is fixed to the valve body (11) with bolts (62).

Each of the counter plate (30), the actuator body (44), the piston (40), and the lid (61) has a through hole (34) that is concentric with each other. The valve spindle (20) has a valve stem (21) that penetrates the through holes (34) of the counter plate (30), the actuator body (44), the piston (40), and the lid (61).

The valve spindle (20) consists of the valve stem (21) and a valve element (22). The valve element (22) is provided with, beginning at the top, an upper contact portion (25), a guide portion (23), and a lower contact portion (24). The lower contact portion (24) is a member (a disc-shaped seal member) that is separate from the upper contact portion (25), and is fixed by caulking.

The axial length of the valve spindle (20) may be adjusted such that the upper end surface of the valve stem (21) does not protrude upward from the lid (61) when the switching valve is in a closed state and that the upper end surface of the valve stem (21) protrudes upward from the lid (61) when the switching valve is in an open state. With this configuration, whether the switching valve is in the closed state or in the open state can be visually confirmed.

Figure 4:
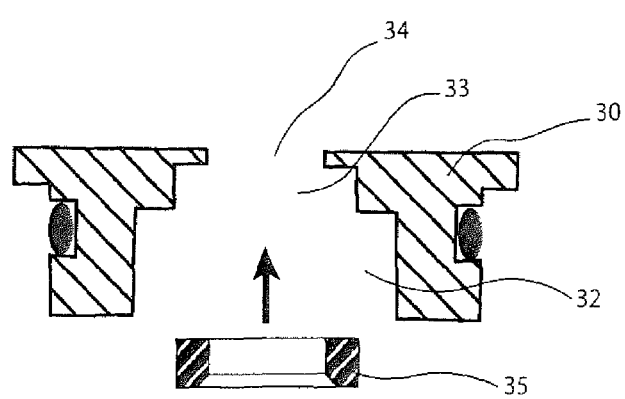
FIG. 4 is a longitudinal sectional view showing an embodiment of an upper valve seat and a counter plate of the switching valve in accordance with the present invention.

As shown in FIG. 4 in an enlarged manner, the counter plate (30) is provided with: a first recess (32) that is open downward; and a second recess (33) that is open toward the first recess (32) and has a smaller horizontal cross-sectional area than that of the first recess (32).

Into the second recess (33) of the counter plate (30), an upper valve seat (35) is press-fitted.

The press-fitted upper valve seat (35) has an annular shape, and is provided with, at a middle portion thereof, a through hole into which the valve spindle (20) is to be inserted.

The switching valve module (10) in which the switching valve is mounted is normally in a closed state. To be more specific, the piston (40) that is urged by the spring (43) moves the valve spindle (20) downward and the lower contact portion (24) comes into close contact with a lower valve seat (12) formed at a lower portion of the valve body (11), whereby inflow of the analyzer gas coming from the analyzer gas inflow passage (52) is interrupted to achieve the closed state.

As a step of sending the analyzer gas from the analyzer gas inlet (51) through the switching valve module (10) to an analysis device, there are two cases, which are: a case where the vent line (53) is first connected to a vacuum pump or the like (not shown), and with this configuration an inside gas is evacuated; and a case where a part of the vent line is open to the air. The vent line (53) communicates with the vent space (60) via the vent line communicating passage (54). In the case of evacuation to be conducted, the gas inside the vent space (60) is evacuated. In the case of being open to the air, the condition through the vent space (60) is the same as that in the air.

In the switching valve at the left, the analyzer gas outlet (57) also serves as a vent line.

Next, the driver gas is sent from the driver gas inlet (58) through the driver gas inflow passage (59) to the drive space (63), whereby internal pressure of the drive space (63) is increased to push up the piston (40).

Figure 2:
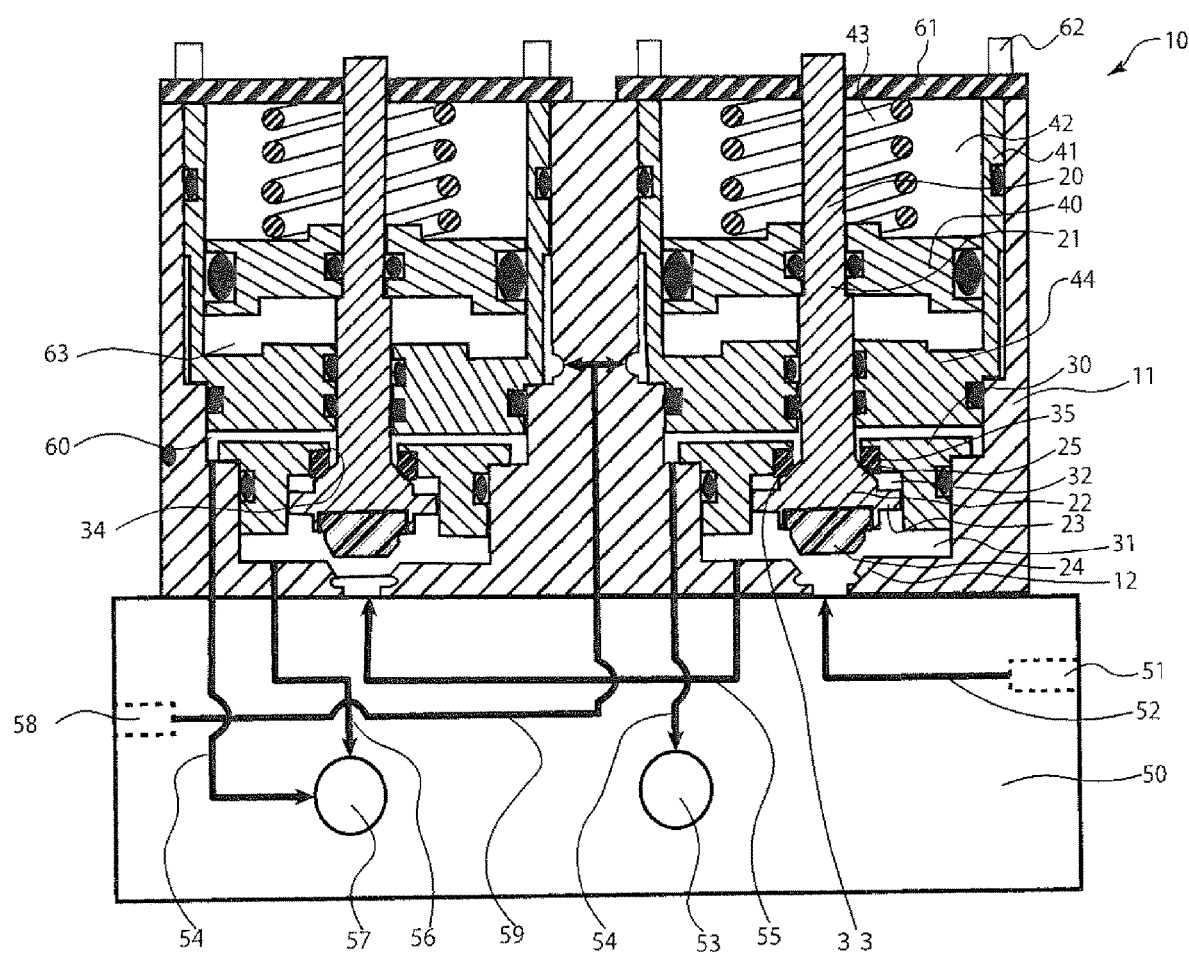
FIG. 2 is a longitudinal sectional view showing an embodiment of the switching valve module in which the switching valve in accordance with the present invention is mounted, which shows a state when the valve is open.

With an elevation of the piston (40), the valve spindle (20) fixed to the piston (40) moves upward. The lower contact portion (24) moves away from the lower valve seat (12) whereby the analyzer gas fills up the control space (31). The upper contact portion (25) comes into close contact with the upper valve seat (35) to stop the outflow of the analyzer gas to the vent space (60). FIG. 2 shows a state in which the upper contact portion (25) is in close contact with the upper valve seat (35).

Because the analyzer gas is continuously sent further, the analyzer gas passes through the control space (31) and the analyzer gas migration passage (55) to enter the adjacent control space (31), passes through the analyzer gas outflow passage (56), and flows out from the analyzer gas outlet (57) to be sent to the analysis device.

FIG. 4 shows the counter plate (30) and the upper valve seat (35) being separated from each other. The counter plate (30) is provided with a first recess (32) and a second recess (33) that are both open downward, and the upper valve seat (35) is press-fitted into the second recess (33).

The second recess (33) and the upper valve seat (35) are formed with great accuracy through machine work and the like, and therefore the upper valve seat (35) has almost no runout.

Figure 5:
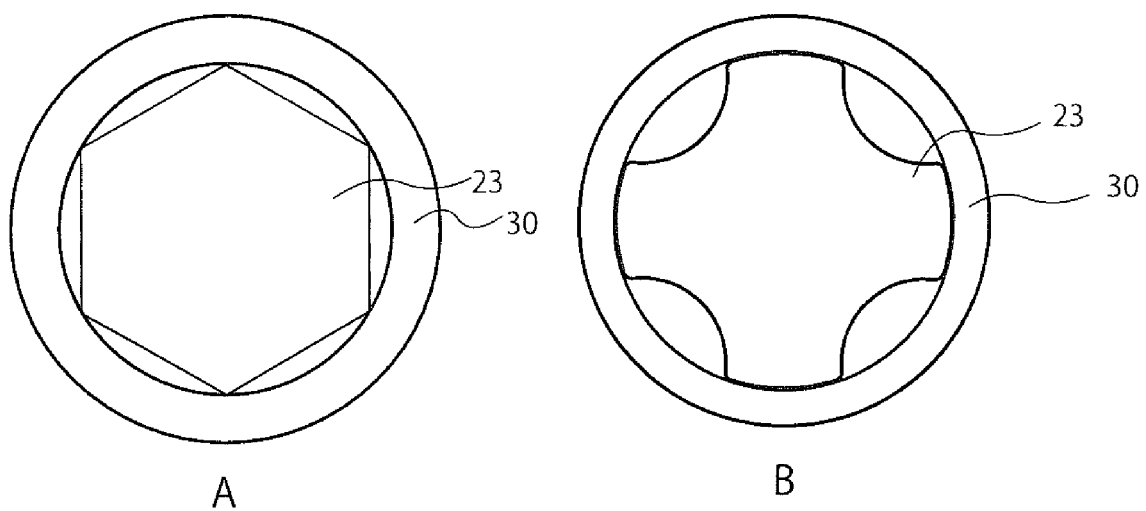
FIG. 5 is a horizontal sectional view showing a guide portion and the counter plate of the switching valve in accordance with the present invention.
Figure 6:
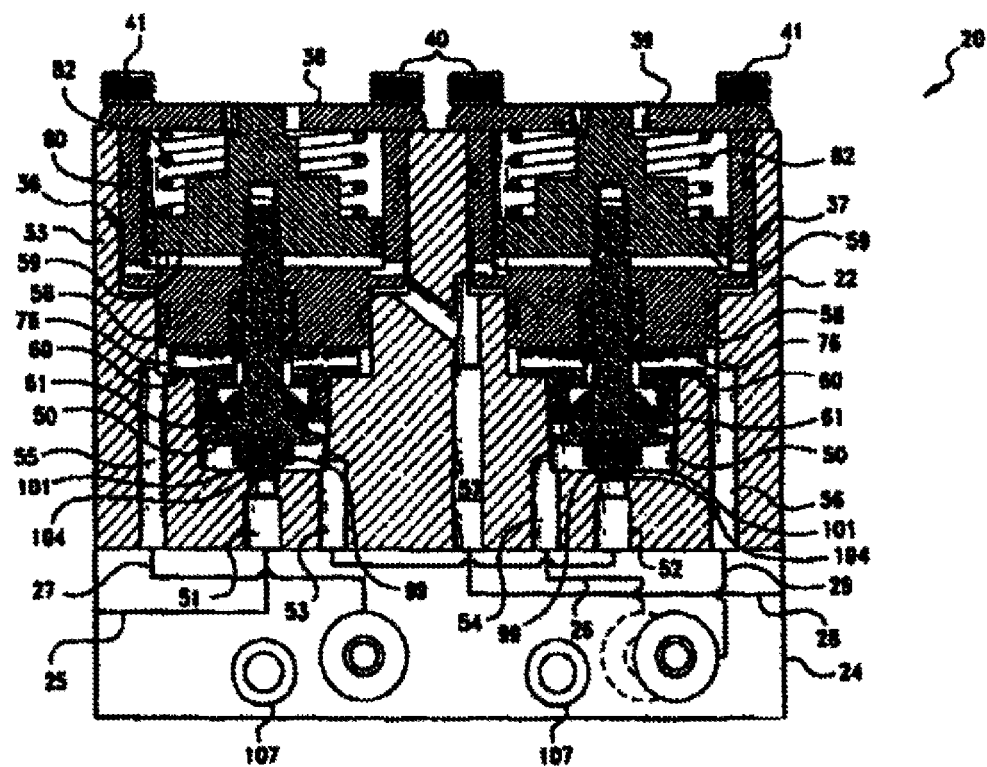
FIG. 6 is a longitudinal sectional view of a conventional switching valve.
Figure 7:
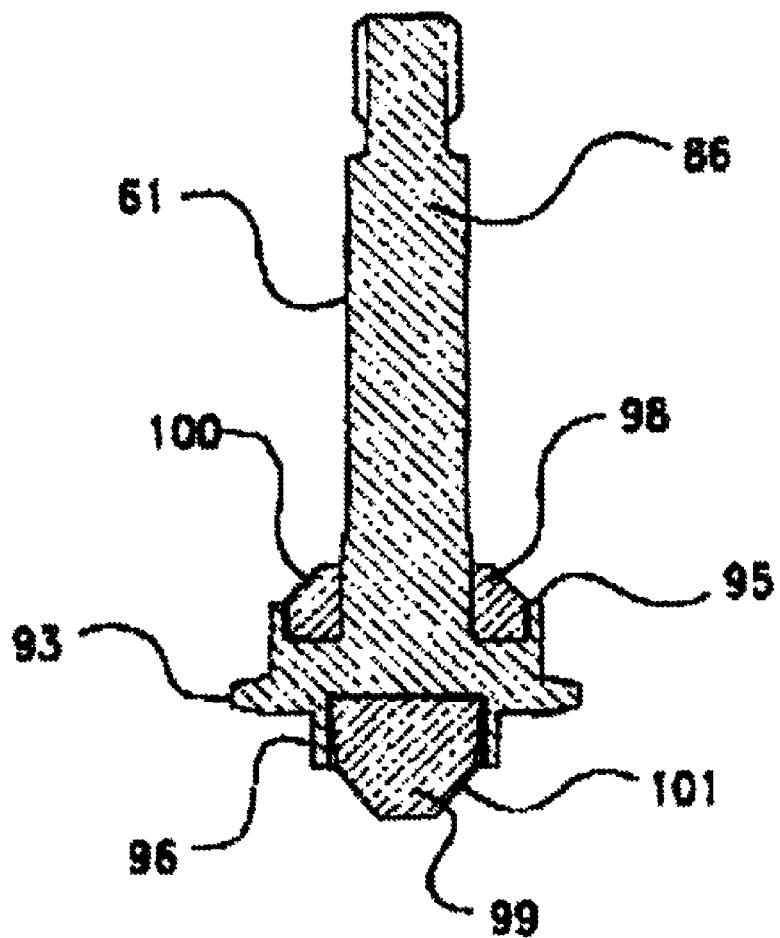
FIG. 7 is a longitudinal sectional view of a valve spindle for use in a conventional switching valve.

FIG. 5A shows the counter plate (30) and the guide portion (23) in horizontal cross section. In this example, the cross section of the guide portion (23) is a regular hexagon, but it is not limited to a regular polygon. Because the vertexes of the regular polygon serve as guides for guiding the side surface of the first recess (32), the horizontal deviation of the axis of the valve element (22) is suppressed even when the valve spindle (20) moves vertically, which contributes to the further suppression of the runout.

As shown in FIG. 5B which shows another embodiment, the horizontal cross section of the guide portion (23) is not a polygon, but a circle in which a recessed portion (groove) or a hole may be provided at any location. The gap thus formed may be configured in any shape or structure as long as it serves as a flow passage for communicating with the vent space (60), which is an upper space above the control space (31), the first recess (32), and the counter plate (30). As such, the gap may be provided with a recess at the counter plate (30) side.

In order to avoid the pressure to be applied to only a portion of the valve element (22), it is preferable that the groove or the like provided in the guide portion (23) or the counter plate (30) for communication is configured such that the pressure is applied evenly to the entire valve element (22).

The shapes shown FIG. 5A and FIG. 5B are merely examples, and therefore the shape of the horizontal cross section is not limited to these shapes.

As described above, the guide portion (23) serves as a component to prevent runout of the valve element (22), and at the same time, in the case where the vent line (53) is evacuated, it is possible to evacuate, before the analyzer gas being passed, a gas not only in the vent space (60), which is an upper space located above the control space (31), the first recess (32), and the counter plate (30), but also in the analyzer gas migration passage (55).

In addition, it is possible to facilitate switching gases to be passed among many types of gases by using a plurality of the switching valve modules (10), including the switching valves in accordance with the present invention, being connected to one another.

REFERENCE SIGNS LIST

10: switching valve module
11: valve body
12: lower valve seat
20: valve spindle
21: valve stem
22: valve element
23: guide portion
24: lower contact portion
25: upper contact portion
30: counter plate
31: control space
32: first recess
33: second recess
34: through hole
35: upper valve seat
40: piston
41: cylindrical body portion
42: drive space
43: spring
44: actuator body
50: base
51: analyzer gas inlet
52: analyzer gas inflow passage
53: vent line
54: vent line communicating passage
55: analyzer gas migration passage
56: analyzer gas outflow passage
57: analyzer gas outlet
58: driver gas inlet
59: driver gas inflow passage
60: vent space
61: lid
62: bolt
63: drive space

The invention claimed is:

1. A switching valve comprising:
a valve body having a control space for controlling a fluid;
a valve element configured to move within the control space to control the fluid; and
a counter plate configured to prevent the fluid from flowing upward out of the control space,
the switching valve characterized in that the valve element is provided with a lower contact portion configured to come into contact with a lower valve seat disposed at the valve body when the valve is closed and with an upper contact portion configured to come into contact with an upper valve seat disposed at the counter plate when the valve is open, the counter plate has a first recess that is open downward and a second recess that is open toward the first recess and has a smaller horizontal cross-sectional area than that of the first recess, and the upper valve seat is press-fitted into the second recess, wherein an intermediate portion between the lower contact portion and the upper contact portion is provided with a guide portion, and a side surface of the first recess is circumscribed on the guide portion, and wherein a gap is provided between the side surface of the first recess and a side surface of the guide portion.

* * * * *